May 23, 1961  W. E. CLACK  2,985,193
CONTROL VALVES
Filed April 29, 1957  2 Sheets-Sheet 1

INVENTOR.
WILLIS E. CLACK
BY
Joseph G. Werner
ATTORNEY.

May 23, 1961  W. E. CLACK  2,985,193
CONTROL VALVES
Filed April 29, 1957  2 Sheets-Sheet 2
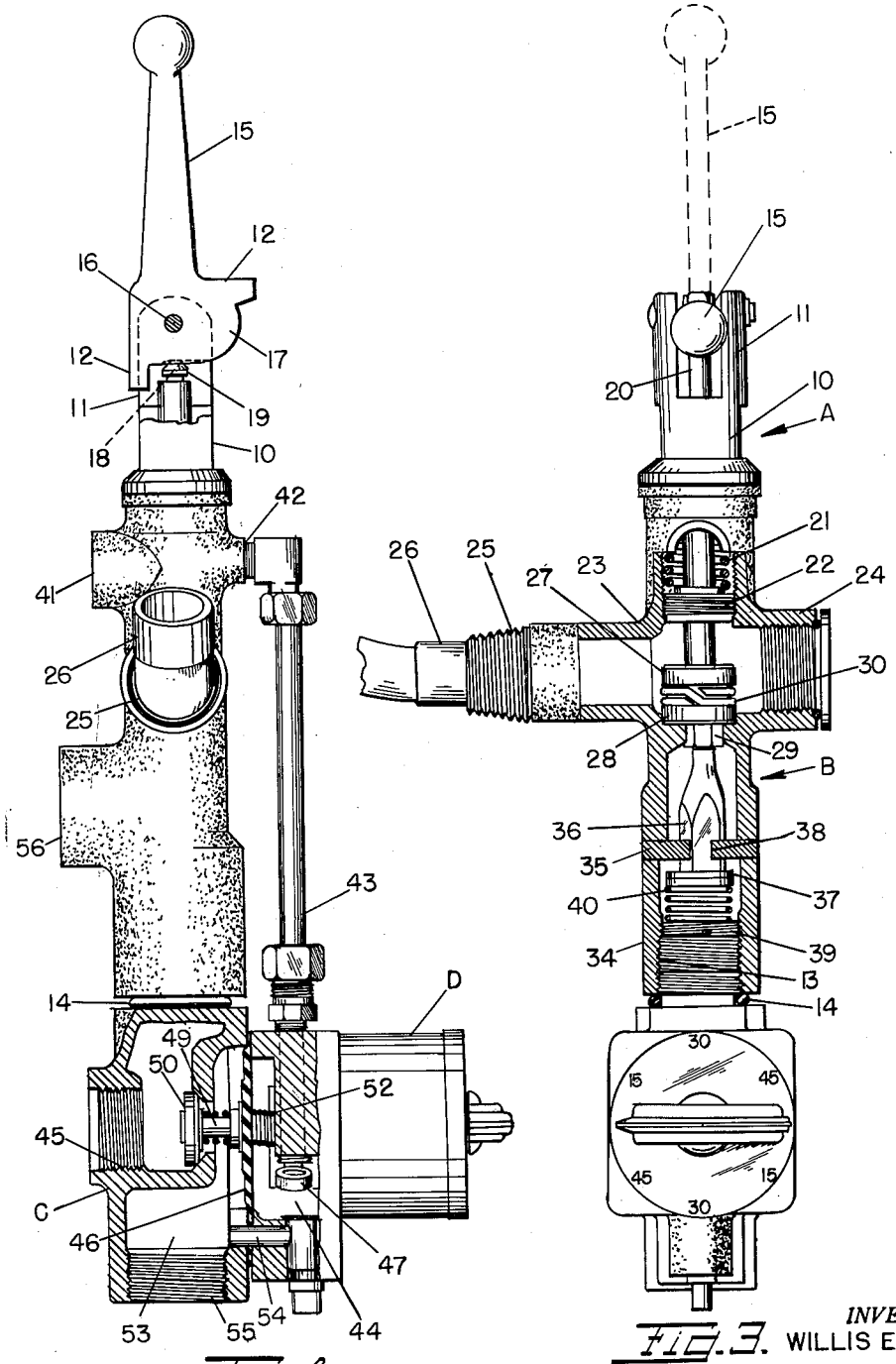
INVENTOR.
WILLIS E. CLACK
BY
Joseph G. Warner
ATTORNEY.

United States Patent Office 2,985,193
Patented May 23, 1961

2,985,193

CONTROL VALVES

Willis E. Clack, Madison, Wis., assignor to Clack Water Treatment, Inc., Madison, Wis., a corporation of Wisconsin Filed Apr. 29, 1957, Ser. No. 655,777

3 Claims. (Cl. 137—630.22)

This invention relates to improvements in control valves.

The object of the invention is to provide a valve for use primarily with a system in which water is circulated in succession through water softening tanks and through a regenerating circuit with timing mechanism controlling some of the steps in the operation.

A further object is to provide a valve for the purpose indicated which has a quick acting two way cam control for the elements controlling the circulation of the water.

Another object is to provide a valve which may be used on both high and low water pressure systems.

A still further object is to provide a valve for a system of the kind indicated which has a minimum of parts and is therefore relatively simple when the multiple functions which it performs are considered.

An additional object is to provide a valve of such design that there is a minimum amount of wear on the moving parts.

In certain modern operations in cleaning systems where only hard water is available it is desirable to circulate the hard water through a tank containing well known water softening compounds. In such systems it is now common practice to circulate a regenerating fluid through the softening compound to restore the compound to a condition wherein it may be used over and over again. The valve of the instant invention is adapted for use in such a system to control flow of the fluid through the several cycles.

Further objects and advantages will become apparent from the description which follows and from the illustrations in the drawings in which a preferred embodiment of the principles of the invention has been selected for exemplification.

In the drawings:

Fig. 2 is a view partly in section of the timing mechanism and a valve controlled thereby, with the valve in open position;

Fig. 3 is a vertical sectional view of the valve illustrated in Fig. 1 but showing the valve in another position; and Fig. 4 is a view taken at right angles to Fig. 3 broken away to show the timing mechanism as illustrated in Fig. 2 but showing the controlled valve in a closed position, the shape of the operating cam and the other port openings through the valve casing.

Figure 1:
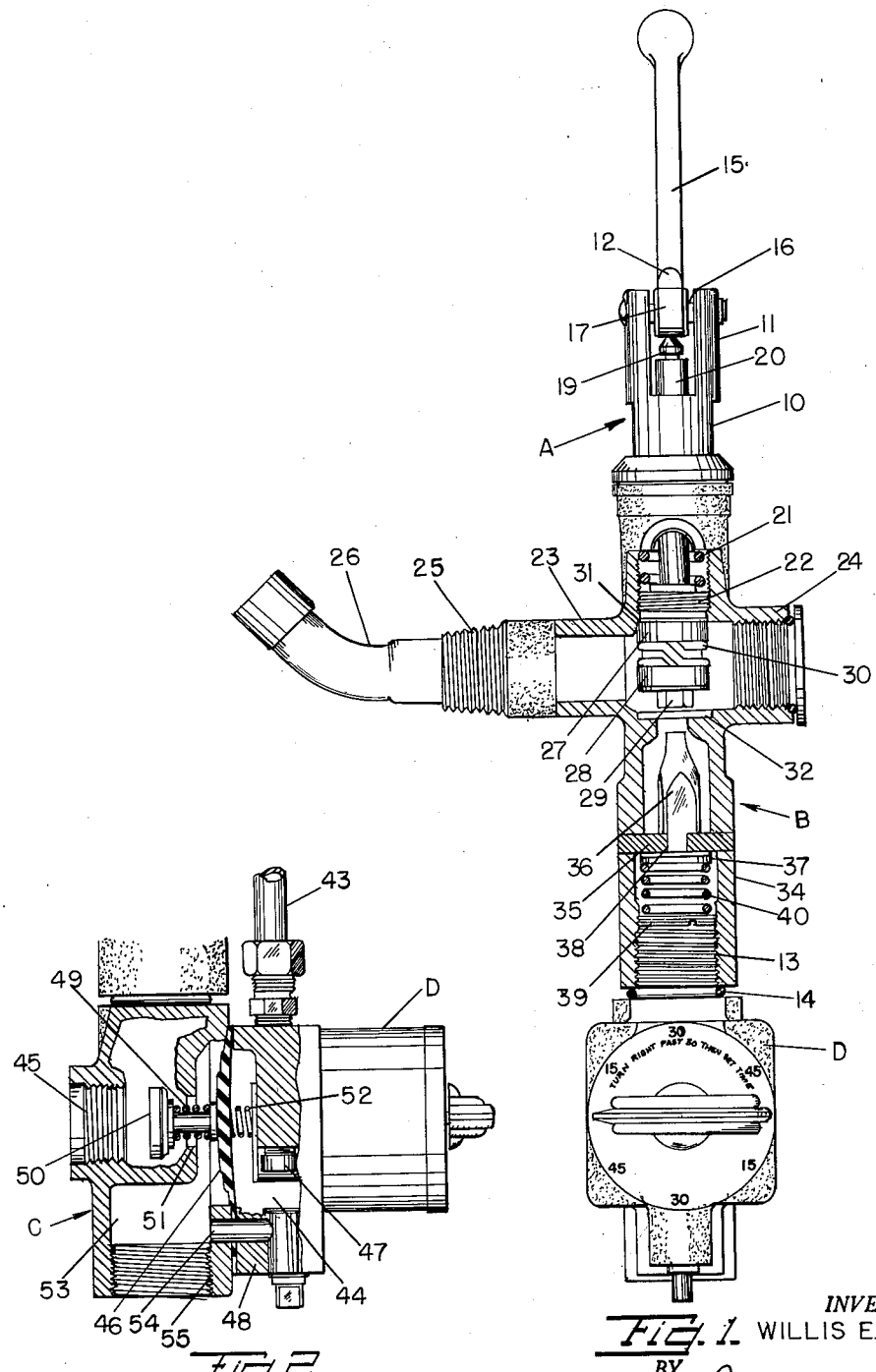
Fig. 1 is a vertical sectional view of a valve constructed in accordance with the present invention and showing valve in one position.

The controlling valve is preferably formed in three sections, A, B and C, with a controlling device D secured to the side of the section C. The sections A, B and C are secured in alignment by screw threading as shown at 13 with a sealing ring 14 engaging the contacting parts to prevent leaks. The timing device D is bolted or otherwise secured to the side of the section C. The section A carries operating means for the valves. This means comprises a body portion 10 having a forked upper end 11 in which an operating lever 15 is mounted on a pin 16. The lever has a cam 17 on its lower end, the cam having low portions 18 which hold the valves in locked positions when the lever is moved to the upright position shown in Figs. 1 and 4 and in the horizontal position shown in solid lines in Fig. 3. The cam 17 engages a head 19 adjustably threaded in the end of a valve stem 20. The cam has pins 12 adapted to engage the sides of the stem 20 to limit movement of the lever. The valve stem has a shoulder, not shown, against which the upper end of a spring 21 engages, the lower end of the spring seating on a hollow nut which is threaded in the upper arm of a cross fitting composing the central body section B. As stated the cam has low portions 18 which permit the spring 21 to hold the valve stem in its uppermost position when the operating lever is moved to the position of Figs. 1 and 4 and to hold the valve stem in its lowermost position when the operating lever 15 is moved to the position shown in solid lines in Fig. 3. The cross fitting has extending portions 23 and 24 the latter of which is internally threaded to receive a closing nut. An extending portion 23 has a tapered thread 25 which is screw threaded. A small tube 26 is secured to the end of the section 23 as by welding and this tube extends into a tank. The lower end of the valve stem carries spaced rings 27 and 28 which are held on the stem by a nut 29. A short spring 30 is positioned between the rings, thus holding them apart. The ring 28 is movably axially slightly on the stem and is held against displacement by the nut 29. The ring 27 is prevented from axial movement by stop means on the valve stem which are not shown. The rings are provided on their faces with resilient means and these serve as valves which seat respectively on valve seats 31 and 32, the ring 27 seating on valve seat 31 and the ring 28 on valve seat 32.

The lower end 34 of the section B has an internal partition 35 through a port of which another valve stem 36 extends. This valve stem is square in cross section or other angular shape so that the corners engage the sides of the opening but permit fluid to flow through the opening. A valve 37 is secured on the lower end of the valve stem and is movable to close the opening 38 through the partition. The lower portion 34 of the section B is threaded and receives a threaded ring 39 which forms a seat for a spring 40 which engages the valve stem and tends to urge the valve 37 toward its seat.

The upper end of the section B, above the cross portions 23 and 24 and at right angles to these latter portions, is provided with screw threaded openings 41 and 42. The opening 41 is adapted to be connected to a drain and the opening 42 has connected thereto a tube 43 the other end of which tube is connected to the top of the timing device D and to a chamber 44 in the timing device. The lower section C is provided with a threaded opening 45 which is adapted to be connected to soft water service. The timing device D is secured to the side of the section C opposite to the opening 45. The timing device has therein a chamber 44 one side of which is formed by a diaphragm 46. Communication between the chamber 44 and the tube 43 is controlled by a valve 47 which is opened manually periodically and held open by the timing device. The diaphragm 46 is held to the side of the section C between edges 48 of the timing device casing. A valve stem 49 is connected to the diaphragm and this valve stem carries a valve 50 which controls flow of fluid through a service valve opening 51. A spring 52 back of the diaphragm urges the valve 50 to open position. A chamber 53 is formed outside of the diaphragm and this chamber is connected by a port 54 with the chamber 44 in the timing device. An opening 55 is connected to the bottom of the tank.

For connecting the device to a hard water inlet, a threaded opening 56 is provided in the section between the partition 35 and the valve 32.

In operation, when the control lever is in the upper position, as shown in Fig. 1, the valve 28 is off its seat and fluid flows between opening 56 through valve opening 32 to tube 26. The valve 27 is seated on valve seat 31. When the control handle 15 is moved to the horizontal position, as shown in Fig. 3, the valve 28 is on its seat 32 and the valve 27 is off its seat 31, opening communication between the top of a tank, not shown, and the opening 41 to drain. This position causes the backwash step in the usual water softening operation. Further, when the timing device is set for operation, i.e., cocked, the valve 47 is held open and the diaphragm 46 moves the valve 50 to its seat. This step provides for shutting off the tank to supply, by-passing the water supply from the conditioner and permitting the draining of the tank to permit the addition of salt or chemical. When the control handle 15 is in an upper position as shown in Fig. 4, with the timing mechanism set for operation at a predetermined time, 60 minutes, for example, water is supplied to flush the salt or chemicals down through the unit and up through the assembly to drain. The salt and chemical are not permitted to be drawn into the house line 45. Further, water is available to the house line 45, as allowed by valve 37 at reduced pressure. With this system the flow rate through the unit is assured of adequate water pressure for the complete regeneration regardless of the by-passing of water through the house line, as priority of pressure is provided for the regeneration step. This feature, thus has the further advantage of tending to limit the amount of water that may be by-passed.

When the timer returns to "off" position, thus closing valve 47, the diaphragm 46 is returned to the position shown in Fig. 2, opening valve 50. Thus, the unit is automatically returned to normal service.

It is to be understood that the present invention is not confined to the specific form of apparatus herein illustrated and described but embraces all such modifications thereof as come within the scope of the following claims.

I claim:

1. In a system for circulating fluids of different kinds, a control valve casing having upper and lower connecting chambers and a plurality of openings connected to sources of said fluids of different kinds, valve ports at the junction of said chambers and at the opposed end of each said chamber, a valve stem having valves thereon positioned in said upper chamber in control of the said valve ports of said upper chamber, a second valve stem positioned in said lower chamber in detached communication with the first valve stem, a valve positioned on said second valve stem in control of the valve port at said opposed end of the lower chamber, a lever operable to move both valve stems and said valves to positions selectively to control each of the ports; means whereby to permit the flow of fluid through the valve port at said opposed end of the lower chamber upon being subjected to pressure differential created by a decrease in pressure below said valve on said second stem when said valve is in a normally closed position, a third chamber connected to said lower chamber through a service port, normally closed conduit means connecting said third chamber to an opening in said casing above said upper chamber and control means for closing said service port between said lower chamber and said third chamber and opening said conduit means.

2. The invention as claimed in claim 1 wherein said lever has a cam thereon for operating said valve stems and valves, said cam having means thereon for locking the valve stems and valves in position.

3. A control valve for a circulating fluid system comprising a valve body having an inlet chamber adapted to receive a fluid supply under pressure, a first outlet chamber connected to said inlet chamber at one end thereof through a first valve port, an outlet port in said first outlet chamber, a drain port connected to said outlet chamber through a second valve port; a two position valve, said valve in its first terminal position closing said first valve port and opening said second valve port, and said valve in its second position closing said second valve port and opening said first valve port; a reciprocable valve stem carrying said valves and movable to said two terminal positions, a second outlet chamber connected to said inlet chamber at the other end thereof through a third valve port having a third valve in detached communication with said valve stem, said valve stem opening said third valve port when said stem is in its first terminal position, spring biasing means for maintaining said third valve closed when said stem is in its second position, said third valve being opened when subjected to a pressure differential between said inlet chamber and said second outlet chamber of a magnitude sufficient to overcome said spring biasing means; a fluid discharge port in said second outlet chamber, a fluid delivery port adapted to receive fluid from said outlet port in said first outlet chamber, a fourth valve port having a fourth valve between said discharge port and said delivery port, a by-pass conduit connected between said fluid delivery port and said drain port, a fifth valve port having a fifth valve in said conduit, a two position control means for substantially simultaneously controlling said fourth and fifth valves, said control means opening said fourth valve port and closing said fifth valve port in its first position and said control means closing said fourth valve port and opening said fifth valve port in its second position.

References Cited in the file of this patent

UNITED STATES PATENTS

| | | |
|---|---|---|
| 1,066,213 | Moore | July 1, 1913 |
| 2,396,809 | Addison | Mar. 19, 1946 |
| 2,699,207 | Russell et al. | Jan. 11, 1955 |
| 2,703,105 | Stoner | Mar. 1, 1955 |
| 2,711,757 | Gardner | June 28, 1955 |
| 2,715,098 | Whitlock | Aug. 9, 1955 |
| 2,717,003 | Jay et al. | Sept. 6, 1955 |
| 2,796,177 | Kryzer | June 18, 1957 |
| 2,808,882 | Aukerman et al. | Oct. 8, 1957 |
| 2,935,092 | Stoner | May 3, 1960 |